US011734547B2

(12) United States Patent
Luther et al.

(10) Patent No.: US 11,734,547 B2
(45) Date of Patent: Aug. 22, 2023

(54) MODELLING REQUEST SEQUENCES IN ONLINE-CONNECTED VIDEO GAMES

(71) Applicant: Electronic Arts Inc., Redwood City, CA (US)

(72) Inventors: Matthew Luther, Burnaby (CA); Mohsen Alimomeni, Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 583 days.

(21) Appl. No.: 17/014,934

(22) Filed: Sep. 8, 2020

(65) Prior Publication Data

US 2022/0076126 A1 Mar. 10, 2022

(51) Int. Cl.
*G06N 3/08* (2023.01)
*G06N 3/045* (2023.01)
(Continued)

(52) U.S. Cl.
CPC ........... *G06N 3/045* (2023.01); *G06F 18/214* (2023.01); *G06F 18/24765* (2023.01);
(Continued)

(58) Field of Classification Search
CPC ........ G06N 3/045; G06N 3/044; G06N 3/088; G06N 3/08; G06N 20/00; G06N 7/01;
(Continued)

(56) References Cited

U.S. PATENT DOCUMENTS

| | | | |
|---|---|---|---|
| 9,892,414 B1* | 2/2018 | Henry | G06N 3/08 |
| 11,651,271 B1* | 5/2023 | Xu | G06N 20/00 |
| | | | 706/12 |
| 2021/0124628 A1* | 4/2021 | Ding | G06N 3/045 |

OTHER PUBLICATIONS

Karpathy, Andrej, "The Unreasonable Effectiveness of Recurrent Neural Networks," May 21, 2015, Retrieved from http://karpathy.github.io/2015/05/21/rnn-effectiveness/.

(Continued)

*Primary Examiner* — Kyung H Shin
(74) *Attorney, Agent, or Firm* — Gray Ice Higdon

(57) ABSTRACT

This specification describes a computer-implemented method for testing the performance of a video game server. The method comprises initializing a recurrent neural network. The recurrent neural network is trained based on requests sent from one or more client devices to the video game server. The initializing comprises inputting a start token into the recurrent neural network. An output distribution for a first-time step is generated, as an output of the recurrent neural network. The output distribution comprises a probability of generating each of a set of one or more requests to the video game server, in addition to a probability of generating a stop token. A first request from the set of one or more requests is selected based on the output distribution. The method comprises for one or more further time steps, until a stop token has been selected from output of the recurrent neural network: inputting, into the recurrent neural network, a request selected in the previous time step; generating, as an output of the recurrent neural network, an output distribution for the time step; and selecting, based on the output distribution, a request. A generated sequence of requests is stored. The generated sequence of requests comprises one or more of the requests selected at each respect time step. The generated sequence of requests is inputted into a test generator. A performance test for testing the performance of the video game server is generated by the test generator.

20 Claims, 9 Drawing Sheets

(51) Int. Cl.
*G06N 3/084* (2023.01)
*G06F 18/214* (2023.01)
*G06F 18/24* (2023.01)
*G06N 3/047* (2023.01)
*G06N 20/00* (2019.01)
*G06F 16/903* (2019.01)
*G06N 3/044* (2023.01)

(52) U.S. Cl.
CPC ............... *G06N 3/047* (2023.01); *G06N 3/08* (2013.01); *G06N 3/084* (2013.01); *G06N 20/00* (2019.01); *G06F 16/903* (2019.01); *G06N 3/044* (2023.01)

(58) Field of Classification Search
CPC ...... G06F 16/903; G06F 16/955; G06F 9/541; G06F 21/554; G06F 21/552; G06F 21/53; G06F 16/9535; H04L 63/1433; G06Q 30/01; G06Q 30/0617
See application file for complete search history.

(56) References Cited

OTHER PUBLICATIONS

Anup K Ghosh, Aaron Schwartzbard, and Michael Schatz. Learning program behavior profiles for intrusion detection. In Workshop on Intrusion Detection and Network Monitoring, vol. 51462, pp. 1-13, 1999. (Particularly section 5 on "Elman Networks").

Otavio Barcelos Gaspareto, Dante Augusto Couto Barone, and Andre Marcelo Schneider. Neural networks applied to speed cheating detection in online computer games. In 2008 Fourth International Conference on Natural Computation, vol. 4, pp. 526-529. IEEE, 2008.

Kusno Prasetya and Zheng da Wu. Artificial neural network for bot detection system in MMOGs. In Proceedings of the 9th Annual Workshop on Network and Systems Support for Games, p. 16. IEEE Press, 2010.

Peter Laurens, Richard F Paige, Phillip J Brooke, and Howard Chivers. A novel approach to the detection of cheating in multiplayer online games. In 12th IEEE International Conference on Engineering Complex Computer Systems (ICECCS 2007), pp. 97-106. IEEE, 2007.

Siu F Yeung and John CS Lui. Dynamic bayesian approach for detecting cheats in multi-player online games. Multimedia Systems, 14(4):221-236, 2008.

Kuan-Ta Chen, Hsing-Kuo Kenneth Pao, and Hong-Chung Chang. Game bot identification based on manifold learning. In Proceedings of the 7th ACM SIGCOMM Workshop on Network and System Support for Games, pp. 21-26. ACM, 2008.

Luca Galli, Daniele Loiacono, Luigi Cardamone, and Pier Luca Lanzi. A cheating detection framework for unreal tournament iii: A machine learning approach. In 2011 IEEE Conference on Computational Intelligence and Games (CIG'11), pp. 266-272. IEEE, 2011.

Darrell Bethea, Robert A Cochran, and Michael K Reiter. Server-side verification of client behavior in online games. ACM Transactions on Information and System Security (TISSEC), 14(4):32, 2011.

Jonathon T Giffin, Somesh Jha, and Barton P Miller. Detecting manipulated remote call streams. In USENIX Security Symposium, pp. 61-79, 2002.

Uwe Hermann, Stefan Katzenbeisser, Christian Schallhart, and Helmut Veith. Enforcing semantic integrity on untrusted clients in networked virtual environments. arXiv preprint cs/0503080, 2005.

Somesh Jha, Stefan Katzenbeisser, Christian Schallhart, Helmut Veith, and Stephen Chenney. Enforcing semantic integrity on untrusted clients in networked virtual environments. In 2007 IEEE Symposium on Security and Privacy (SP'07), pp. 179-186. IEEE, 2007.

* cited by examiner

MODELLING REQUEST SEQUENCES IN ONLINE-CONNECTED VIDEO GAMES

BACKGROUND

Many modern video games are online-connected games in which at least some of the content and/or functionality of the video game is accessed via an internet connection with a video game server. In online-connected video games, communication between clients and the video game server may be facilitated by one or more application programming interfaces (API) via which clients may transmit API requests to the server to request content or functionality. However, as the complexity of online services increases, so too does the complexity of API request sequences received at the video game server. This can lead to challenges in, for example, load or functional testing of online-connected video games.

SUMMARY

In accordance with a first aspect, this specification describes a computer-implemented method for testing the performance of a video game server. The method comprises initializing a recurrent neural network. The recurrent neural network is trained based on requests sent from one or more client devices to the video game server. The initializing comprises inputting a start token into the recurrent neural network. An output distribution for a first-time step is generated, as an output of the recurrent neural network. The output distribution comprises a probability of generating each of a set of one or more requests to the video game server, in addition to a probability of generating a stop token. A first request from the set of one or more requests is selected based on the output distribution. The method comprises for one or more further time steps, until a stop token has been selected from output of the recurrent neural network: inputting, into the recurrent neural network, a request selected in the previous time step; generating, as an output of the recurrent neural network, an output distribution for the time step; and selecting, based on the output distribution, a request. A generated sequence of requests is stored. The generated sequence of requests comprises one or more of the requests selected at each respect time step. The generated sequence of requests is inputted into a test generator. A performance test for testing the performance of the video game server is generated by the test generator.

In accordance with a second aspect, this specification describes a computer implemented method of assessing a sequence of application programming interface (API) requests sent by one or more client devices to a video game server. The sequence of API requests comprises an API request for each time step of a plurality of time steps. The sequence of API requests is inputted into a recurrent API generation neural network. The inputting comprises, for each time step: inputting the API request for the current time step into the recurrent API generation neural network; processing the API request using one or more recurrent layers of the API generation recurrent neural network; generating, using the recurrent API generation neural network, an output distribution for the time step; and determining, from the output distribution, a probability for the API request of a subsequent time step. The received API sequence of requests is assessed, using the determined probabilities of each time step. The assessing comprises determining a sequence probability for the received sequence of API requests.

In accordance with a third aspect, this specification describes a computer-readable medium storing instructions, which when executed by a processor, cause the processor to: receive a training set comprising one or more training examples, each training example comprising a sequence of requests received at a video game server from a client device, wherein the sequence of requests comprises a request corresponding to each time step of a plurality of time steps; and for each training example of the one or more training examples: input, into a recurrent neural network, a request included in the training example for each time step of one or more training time steps, wherein the recurrent neural network comprises a current set of parameters; generate, as an output of the recurrent neural network, an output distribution for each time step of the one or more time steps; determine a loss for each time step of the one or more time steps, comprising performing a comparison between: (i) the output distribution for the time step, and (ii) a request included in the training example for a subsequent time step; and update the set of parameters of the recurrent neural network in dependence on the loss determined for each time step of the one or more time steps of the one or more training examples.

BRIEF DESCRIPTION OF THE DRAWINGS

Certain embodiments of the present invention will now be described, by way of example, with reference to the following figures.

DETAILED DESCRIPTION

General Definitions

The following terms are defined to aid the present disclosure and not limit the scope thereof.

A "user" or "player," as used in some embodiments herein, refers to an individual and/or the computing system(s) or device(s) corresponding to (e.g., associated with, operated by) that individual.

A "client," as used in some embodiments described herein, is a software application with which a user interacts, and which can be executed on a computing system or device locally, remotely, or over a cloud service.

A "server" as used in some embodiments described here, is a software application configured to provide certain services to a client, e.g. content and/or functionality An "access flow" as used in some embodiments described herein is a sequence of requests sent to a server for access to services provided by the server.

A "video game" as used in some embodiments described herein, is a virtual interactive environment in which players engage. Video game environments may be facilitated through a client-server framework in which a client may connect with the server to access at least some of the content and functionality of the video game.

An "online-connected video game" as used in some embodiments described herein is a video game in which at least some of the content and functionality of the game is accessed via the internet.

A "performance test" as used in some embodiments described herein is a test of how well a server performs. A performance test may for example comprise a test of server functionality and/or a test of the extent to which the server can handle certain loads. A test of functionality may include a test of whether one or more modules/components of the server function in an intended manner.

Example Video Game Environment

Figure 1:
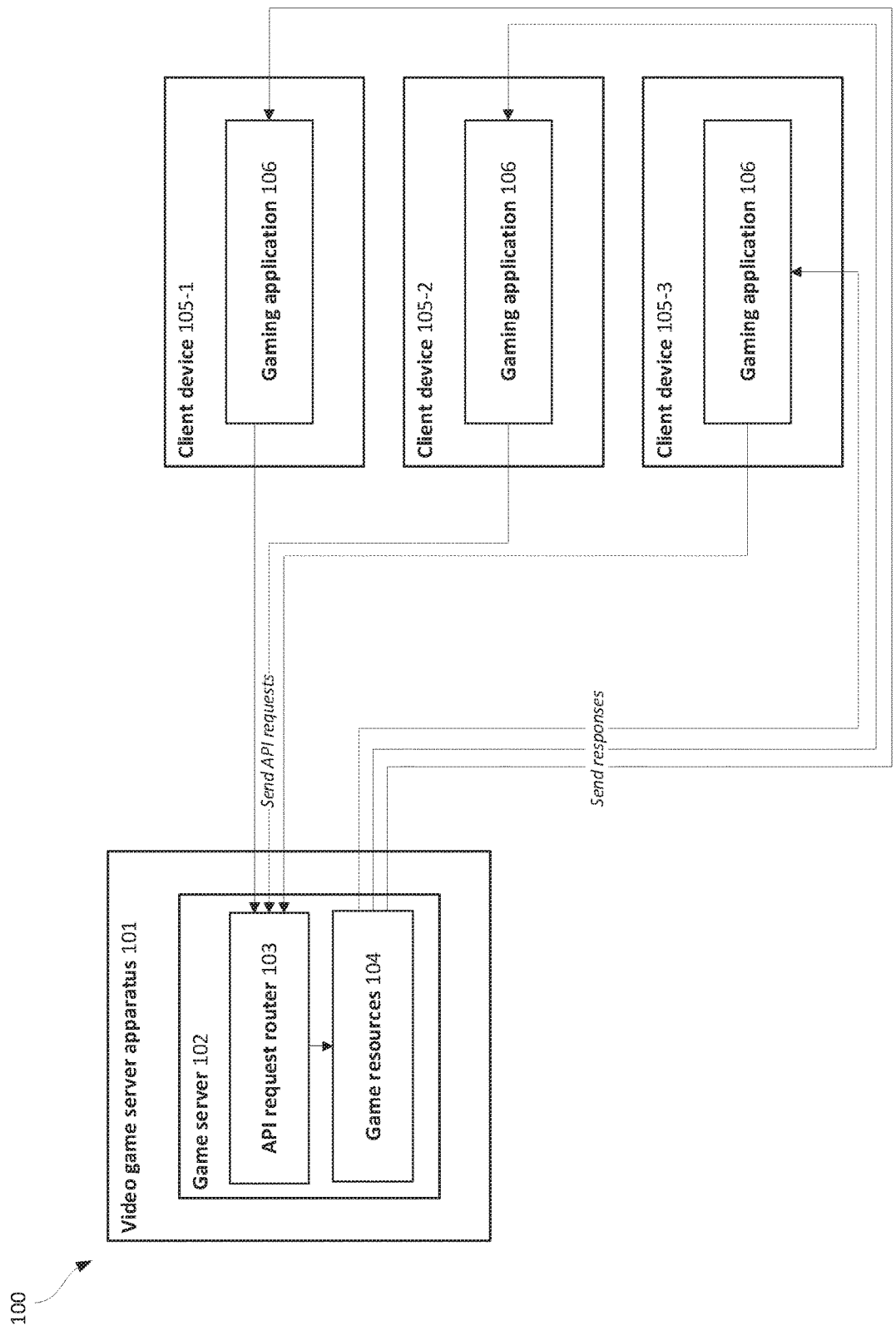
FIG. 1 is a schematic block diagram illustrating an example of a computer system configured to provide a video game environment to players of a video game.

FIG. 1 illustrates an example of a computer system configured to provide a video game environment 100 to players of a video game.

The video game environment too includes video game server apparatus 101, and a plurality of client computing devices 105-1, 105-2, 105-3. Each client computing device 105 is operable by a user and provides a client in the form of gaming application 106 to the user. The client computing device 105 is configured to communicate with the video game server apparatus 101 which provides a game server 102 for providing content and functionality to the gaming application 106. For the sake of clarity, the video game environment too is illustrated as comprising a specific number of devices. Any of the functionality described as being performed by a specific device may instead be performed across a number of computing devices, and/or functionality described as being performed by multiple devices may be performed on a single device. For example, multiple instances of the video game server apparatus 101 (or components thereof) may be hosted as virtual machines or containers on one or more computing devices of a public or private cloud computing environment.

The client computing device 105 can be any computing device suitable for providing the gaming application 106 to the user. For example, the client computing device 105 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras.

Gaming application 106 provides a video game to the user of the client computing device 105. The gaming application 106 may be configured to cause the client computing device 105 to request video game content from the video game server apparatus 101 while the user is playing the video game by transmitting API requests from the client computing device 105 to the video game server apparatus 101. An API request may comprise a request for data (e.g. video game content), a request to write data, a request to authenticate an attempted log in to a user account, a request to perform certain functionality, or any other suitable request transmitted by client computing device 105 to video game server apparatus 101. For example, in a representational state transfer (REST) API, HTTP request methods may be used to indicate requests to process a particular resource. The HTTP methods may comprise a GET method which, e.g., requests a specified resource, a POST method which, e.g., submits data to a specified resource, and a PUT method which, e.g., replaces entities of a specified resource with an indicated resource. Although in some examples, the client computing device 105 may transmit API requests, additionally or alternatively, the gaming application 106 may comprise a web service such that the user can interact with the video game server apparatus 101 through e.g. a web browser and/or a mobile application.

In one example, a video game may include an option to enter online matchmaking in the video game. When a user selects the option for online matchmaking, the gaming application 106 causes an API request to be transmitted to the video game server apparatus 101 which informs the video game server apparatus 101 that the user wants to search for a match lobby to enter. In response, the video game server apparatus 101 transmits a response to the client computing device 105 that the request for online matchmaking was successful, and begins searching for a match lobby for the user. Different API requests may be transmitted to the video game server apparatus 101 for various possible interactions with the video game server apparatus 101, e.g. depending on what particular resource of game resources 104 the user is interacting with, and what operation the user wishes to perform (e.g. requesting to read data or requesting to write data). The API request may comprise any suitable request and may in some cases comprise, for example a representational state transfer (REST) call, a Simple Object Access Protocol (SOAP) call, or a message queue.

The video game server apparatus 101 provides the game server 102, which communicates with the client-side gaming application 106. As shown in FIG. 1, the game server 102 includes an API request router 103 and game resources 104. For example, the API request router 103 may receive an API request from the gaming application 106, and provide video game content from the game resources 104 responsive to the API request to the gaming application 106. The API request router 103 may be configured to store sequences of API requests. For example, the API request router 103 may store all of the API requests (or a portion thereof, e.g. by filtering based on specified API requests, and/or by selecting a certain number of API requests made in a time period) made by a particular client computing device 105 as a sequence of API requests.

The game resources 104 comprises resources that may be required when a user uses the gaming application. For example, the game resources 104 may comprise a log-in system, a matchmaking system, a content provision system, etc. When the request router 103 receives an API request from a gaming application 106, a resource from the game resources 104 may be identified and processed according to the API request. For example, a video game may include a virtual marketplace where players of the video game can trade items obtained in the video game. If a user wishes to place an item on the virtual marketplace, an API request is transmitted by the gaming application 106, containing information about the item, to the API request router 103. The API request router 103 identifies, from the API request, that the resource to be processed in this case is a database comprising items being sold in the virtual marketplace of the video game. The database is then processed by adding the item the user wishes to trade (along with relevant information, e.g. price, included in the API request) to the database. A response is transmitted from the video game server apparatus 101 to the gaming application 106 based on the result of this processing, for example the response may cause a confirmation that the item has been successfully placed on the virtual marketplace to be presented to the user.

Performance Testing

Various example embodiments described herein provide system(s) and methods for performance testing (e.g. load and functional testing) of video game servers.

Video game load and functional testing are quality control processes used during video game development. Testing may attempt to simulate real user access flows in the production environment as closely as possible and/or identify bugs due to unexpected access flow patterns. Additionally, or alternatively, testing may involve load testing the game server with particular subsets of possible access flows to investigate performance of bottlenecks.

In one known testing process, game testers may play a video game to manually test various possible combinations of actions. Log files of the sequences of API requests made to the game server during these sessions may be recorded and analyzed to estimate characteristics of the API request sequences that may be received by the server when the finalized game is being played, for example by estimating the relative frequency of different API requests that are made to the game server during testing. These characteristics can be used to develop test scripts which trigger interactions with the video game server in a manner which attempts to mimic characteristics of the actual API request traffic in the finalised game, for example the sequence and/or number of API requests that are received at the server.

As the complexity of online-connected games increase, it can be challenging to accurately predict such characteristics by manual testing alone. Moreover, manual testing may in some cases fail to account for unexpected API request sequences Furthermore, factors such as network connectivity and the computational power of client devices can impact on the flow of API requests received at the game server; these are difficult to account for using manual testing. Still further, prior approaches may only estimate the number and relative frequencies of various requests transmitted to the video game server, rather than modelling entire sequences of requests received at the video game server. As such, performance testing with conventional approaches might not accurately reflect the performance of the video game server with real user traffic.

Example implementations described herein provide systems and methods for improved testing of video game servers. In particular, various example implementations relate to testing the performance of video game servers using a trained recurrent neural network.

The recurrent neural network may be trained to model the distribution of access flows in an automated fashion based on observed real access flows in the production environment. A training engine may read video game application access data and feed it into a recurrent neural network being trained to learn the distribution of access flows. The output from the recurrent neural network comprises a series of access flows (with corresponding distribution) from the learned distribution that can be given to load/functional test scripts. The trained recurrent neural network learns the long-term interactions between steps in observed user flows, and thus accurately reflects real user traffic, which may be changing over time. In some embodiments, a trained recurrent neural network may also classify the flows into normal and abnormal flows, effectively identifying bugs associated with the abnormal flow.

Game Server Testing System

Figure 2:
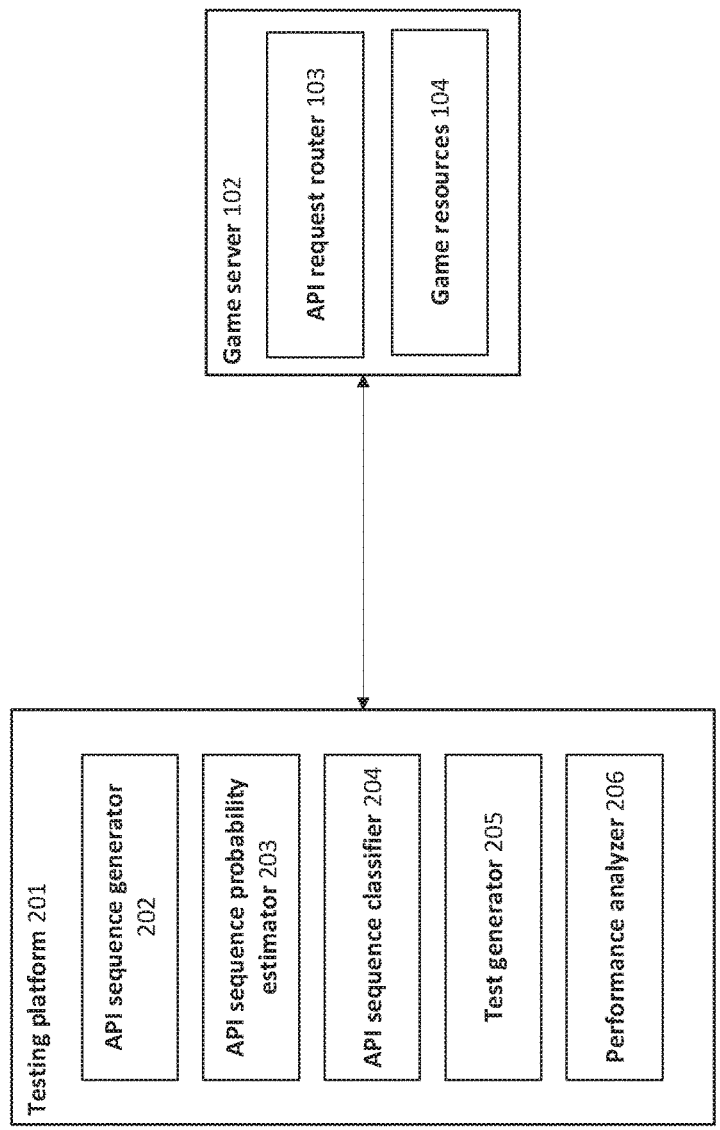
FIG. 2 is a schematic block diagram illustrating an example of a testing platform for testing the performance of a video game server.

Referring to FIG. 2, an example of a computer system 200 providing a testing platform for testing the performance/functionality of a game server is shown.

The testing platform 201 provides a suite of software tools used for testing the performance/functionality of game server 102. Testing platform 201 comprises an API sequence generator 202, an API sequence probability estimator 203, an API sequence classifier 204, a test generator 205, and a performance analyzer 206.

The testing platform 201 leverages use of a trained recurrent neural network for testing the performance of video game server 102. In particular, the API sequence generator 202, the API sequence probability estimator 203, and the API sequence classifier 204 leverage a trained recurrent neural network to provide different functionality for use in testing the performance of the video game server 102.

The API sequence generator 202 comprises a recurrent neural network which has been trained to generate API sequences using training data comprising sequences of API requests made by users of gaming application 106. Recurrent neural network are capable of learning long-term interactions in the training data. Thus, by using a recurrent neural network to model API sequences, realistic sequences of API sequences can be generated which mimic API sequences generated when the game is actually being played.

The API sequence generator 202 outputs a generated sequence of API requests which comprises, for each time step of a plurality of time steps, an API request. In some cases, the API sequence generator 202 may also be configured to generate timing information (or time stamps) for each time step. The timing information for a current time step may measure a duration of time from the current time step to a previous time step immediately preceding the current time step. Alternatively, the timing information may measure a duration of time from the current time step to the first-time step of the generated API sequence. The API sequence generator 202 is described in more detail below with reference to FIG. 3.

The API sequence probability estimator 203 is configured to use probabilities determined by the trained recurrent neural network to determine a probability for a sequence of API requests processed by the trained recurrent neural network. In particular, the trained recurrent neural network outputs a probability of generating the API request of each time step of the sequence. This probability may be a conditional probability of generating the API request at the time step, based on the previously generated API requests. The probabilities generated at each time step may be used to determine an overall probability of generating the API request sequence. For example, the probabilities generated at each time step may be combined by multiplying conditional probabilities in order to obtain an overall probability. Alternatively, the logarithm of the conditional probabilities may be determined at each time step, and an overall sequence probability may be determined by summing the log probabilities together. The probability of a generated sequence of API requests may be used to configure the test generator 205 to generate performance tests using generated API sequences within a particular range of probabilities (e.g. below 10% probability, above 75% probability, etc.). In this way, the game server 102 can be tested in a selectable and controlled way, e.g. it can be tested it with "unusual" (e.g. low probability) sequences only, or with higher-probability sequences only. For example, only using generated API sequences with low probability may be useful for functionality testing of edge cases, and only using generated API sequences with a high probability may be useful for realistic load testing.

The API sequence classifier 204 is configured to use a classification probability determined by the trained recurrent neural network when processing a sequence of API requests and determine a classification for the sequence of API requests. The classification may indicate, for example, whether the sequence of API requests is a normal sequence of API requests or an abnormal sequence of API requests. The classification of a generated sequence of API requests may be used to configure the test generator 205 to generate performance tests using generated API sequences with a particular classification. Alternatively, the classification may be used to generate performance tests using generated API sequences having a particular proportion of classifications (e.g. 70% normal API sequences, and 30% abnormal API sequences).

As described in more detail below, the API sequence classifier may be trained on training data comprising API sequences which are each labelled either "normal" or "abnormal". When preparing the training data, an individual tasked with labelling API sequences may determine that certain API sequences are "normal", for example because these API sequences are recorded in game tester logs or otherwise occurred when the game was actually being played, or because the probability of these sequences occurring when the game is actually being played exceeds a predetermined threshold. These sequences may be labelled as "normal" in the training data. Similarly, the labeller may determine that certain API sequences are "abnormal", for example because they have never occurred when the game was played, or because the probability of these sequences occurring when the game is actually being played is lower than a predetermined threshold, and may label these sequences as "abnormal". In this way the recurrent neural network may be trained to distinguish between such "normal" and "abnormal" API sequences.

The test generator 205 is configured to receive API sequences generated from output of the API sequence generator 202, and to generate a performance test. The test generator 205 may be configured to receive inputs specified by a user of the testing platform 201 (e.g. what type of test should be performed, and/or what types of generated API sequences should be used), and generate a performance test in accordance with the user-specified inputs. The performance test specifies a sequence of API requests that is to be transmitted to the game server 102 when testing the performance of the game server 102. The test generator 205 may also use probabilities of generated API sequences determined by the API sequence probability estimator 203 and/or classifications of generated API sequences determined by the API sequence classifier 204, as discussed above, when generating performance tests.

The performance analyzer 206 receives one or more performance tests generated by the test generator 205, transmits the API requests in the sequence specified by the performance test to the API request router 103, and monitors the results produced during the performance test.

API Sequence Generation and Testing System

Figure 3:
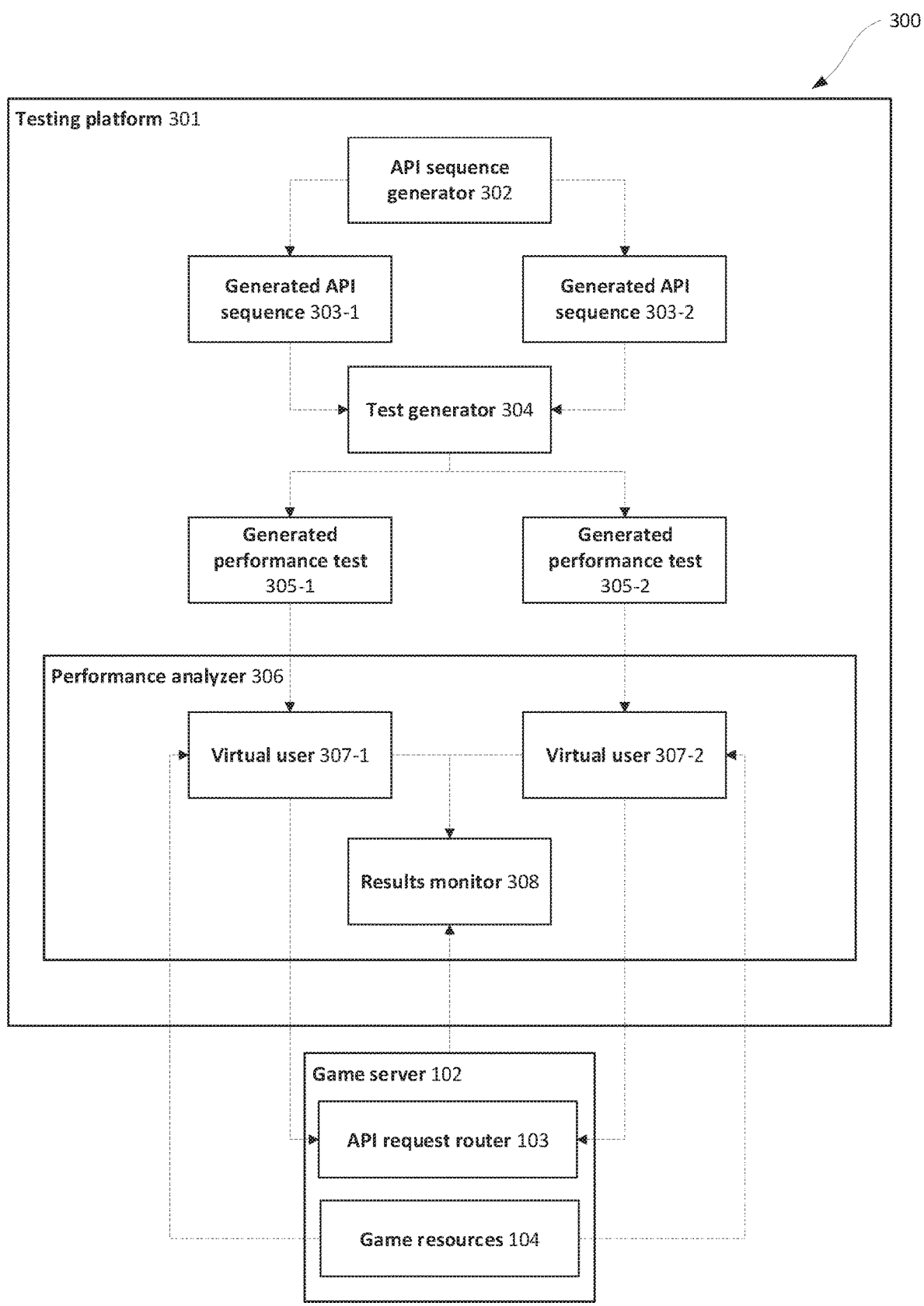
FIG. 3 is a more detailed illustration of a testing platform configured to provide an API sequence generator for use in testing a game server.

FIG. 3 is a more detailed illustration of a testing platform 301 which makes use of an API sequence generator to test a video game server 102. The system 300 allows different types of performance testing (e.g. load testing, stress testing, functionality testing) of a game server 102 using generated API sequences that accurately reflect API sequences transmitted by users of a gaming application to a game server 102.

The testing platform 301 comprises an API sequence generator 302, a test generator 304, and a performance analyzer 306. The API sequence generator 302 comprises a trained recurrent neural network that outputs generated API sequences 303-1, 303-2, or data that can be used to determine the generated API sequences 303. For example, the API sequence generator 302 may output, for each time step of a plurality of time steps, a label indicating a particular API request type that can be received at the API request router 103. API requests may be said to be of the same type if the resource indicated in the API request is the same, and is processed in the same way. For example, two API requests may be of the same type if they are both POST requests to a "\purchased\items" resource. Each different API request type may be represented by a different label, which may be for example, a one-hot encoding of the request type. The API sequence generator 302 may also be configured to generate timing information (or time stamps) for each time step.

The trained recurrent neural network may also be configured to determine a probability of generating the API request type of each time step. This probability may be a conditional probability of generating the API request type of the time step, based on the previously generated API requests. The probabilities generated at each time step may be used (e.g. by API sequence probability estimator 203 of FIG. 2) to determine an overall probability of generating the generated API sequence 303. For example, they may be combined by multiplying conditional probabilities in order to obtain an overall probability. Alternatively, the logarithm of the conditional probabilities may be determined at each time step, and an overall sequence probability may be determined by summing the log probabilities together.

The trained recurrent neural network may also be configured to determine a probability of generating the API request type of each time step. This probability may be a conditional probability of generating the API request type of the time step, based on the previously generated API requests. The probabilities generated at each time step may be used (e.g. by API sequence probability estimator 203 of FIG. 2) to determine an overall probability of generating the generated API sequence 303. For example, they may be combined by multiplying conditional probabilities in order to obtain an overall probability. Alternatively, the logarithm of the conditional probabilities may be determined at each time step, and an overall sequence probability may be determined by summing the log probabilities together.

The trained recurrent neural network may also be configured to determine a classification probability when processing a sequence of API requests. The classification probability may be used (e.g. by API sequence classifier 204 of FIG. 2) to determine a classification for the sequence of API requests. The classification may indicate, for example, whether the sequence of API requests is a normal sequence of API requests or an abnormal sequence of API requests.

The test generator 304 receives generated API sequences 303-1 and 303-2 to generate performance tests 305-1 and 305-2. The test generator 304 may also receive inputs specified by a user of the testing platform 301 and generate performance tests 305 in accordance with the user-specified inputs. For example, the user may specify that load testing should be performed. As such, the test generator 304 may be configured to generate a number of performance tests 305 such that the game server 102 receives similar traffic as to what would be expected during normal use of the gaming application. If the user specifies that stress testing should be performed, then the test generator 304 may generate a number of performance tests 305 such that the game server 102 receives substantially more traffic than in normal use. Additionally, or alternatively, a user of the testing platform 301 may specify that the test generator 304 should generate performance tests 305 with generated sequences of API requests 303 of a certain probability, which probability may be determined using probabilities output by the API sequence generator 302. For example, only using generated API sequences 303 with a low probability may be useful for functionality testing of edge cases, and only using generated API sequences 303 with a high probability may be useful for realistic load testing.

Generated performance tests 305-1, 305-2 are respectively provided to virtual users 307-1, 307-2. Virtual users are simulated client devices that can communicate with the game server 102 in a similar manner to real client devices. A virtual user 307 may be instantiated for each generated performance test 305, and the virtual users 307-1, 307-2 may be configured to execute respective performance tests 305-1, 305-2 concurrently. A virtual user 307 executes a generated performance test 305 which specifies a generated sequence of API requests 303 for the virtual user 307 to transmit to the game server 102. The virtual user 307 is configured to transmit the API requests in the order specified by the generated sequence of API requests 303. For each API request of the generated sequence of API requests 303, the virtual user 307 transmits the API request to the API request router 103 of the game server 102 and receives a response from the game server 102. When the API sequence generator 302 is further configured to output a time stamp for each API request of the generated API sequence 303, the test generator 304 may generate performance test 305 such that, when executed, virtual user 307 transmits each API request in accordance with the time stamp of the API request.

The results monitor 308 determines a performance result for each transmitted API request, based on the received responses. The performance result may comprise an indication as to whether a response to an API request from the video game server includes an error or not. Additionally, or alternatively, the performance result may comprise a measurement of the time between transmitting an API request to the video game server and receiving a response to the API request from the video game server. Additionally, or alternatively, the results monitor 308 result may monitor factors such as CPU utilization, memory utilization, network utilization, and/or storage utilization of the game server 102 during the performance test.

Figure 4:
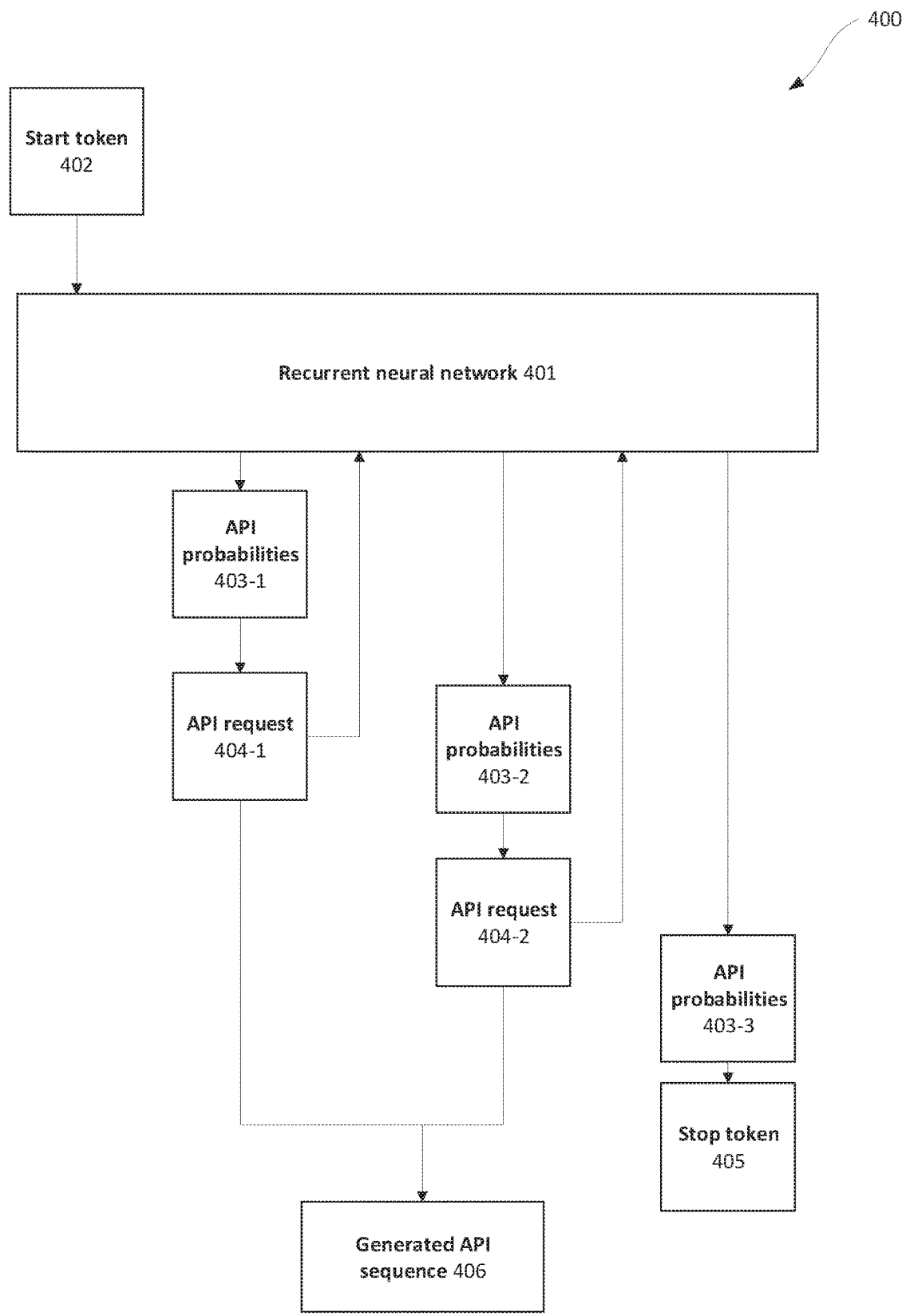
FIG. 4 shows an example API sequence generator used to generate API sequences using a trained recurrent neural network.

Referring to FIG. 4, an example API sequence generator used to generate API sequences is shown. The API sequence generator 400 corresponds to the API sequence generator described in relation to FIGS. 2 and 3.

The API sequence generator 400 comprises a recurrent neural network 401 which has been trained to generate API sequences 406 using training data comprising sequences of API requests made by users of gaming application. The API sequence generator 400 outputs, for each time step of a plurality of time steps, an API request 404 of a particular type. The recurrent neural network 401 is also configured to determine a probability of generating the API request type of each time step. The probabilities generated at each time step may be used to determine an overall probability of generating the generated API sequence. The recurrent neural network 401 may also be configured to generate timing information (or time stamps) for each time step. The timing information for a current time step may measure a duration of time from the current time step to a previous time step immediately preceding the current time step. Alternatively, the timing information may measure a duration of time from the current time step to the first-time step of the generated API sequence. Additionally, or alternatively, the recurrent neural network 401 of the API sequence generator 400 may be used to classify received sequences of API requests.

The recurrent neural network 401 comprises one or more recurrent layers, and one or more feedforward layers, each layer having an associated set of parameters which have been learned after training of the recurrent neural network 401. The recurrent layers may comprise simple recurrent layers, LSTM layers, bidirectional LSTM layers, GRU layers, or any other suitable recurrent layer wherein a hidden state for a current time step is updated using the hidden state of a previous and/or subsequent time step. The recurrent neural network 401 may additionally comprise other types of neural network layers such as convolutional layers, batch normalization layers, dropout layers, etc.

The recurrent neural network 401 is configured to receive an input for each time step of a plurality of time steps, and generate one or more outputs for each of the time steps. Additionally, the recurrent neural network 401 may be configured to generate an output after processing of an entire sequence, e.g. generating an output used to classify a sequence after a stop token has been selected from an output of the recurrent neural network 401. The input to the recurrent neural network 401 at each time step is an indication of either a particular type of API request 404 out of a set of API requests that can be received at a video game server, or a start token 402. For example, the input of each time step may be a one-hot vector such that an index of the one-hot vector corresponds to the start token 402 and the remaining indices of the one-hot vector corresponds to a particular type of API request 404. The recurrent neural network 401 outputs, at each time step, API probabilities 403. The API probabilities 403 for a time step are a vector with elements that indicate a probability of generating each API request in the set of API requests, in addition to a probability of generating a stop token 405, and is conditioned on the inputs of the previous time steps to the recurrent neural network 401. API requests 404 may be selected from API probabilities 403 in any suitable manner, e.g. by selecting the API request with the highest probability, or by sampling from the distribution defined by the API probabilities 403. The recurrent neural network 401 may additionally generate a generated time stamp for the time step.

When generating an API sequence 406, the API sequence generator 400 initializes the recurrent neural network 401 by providing a start token 402 (or an indication thereof) to the recurrent neural network 401. This initialization may also involve initializing the hidden states of the recurrent layers, e.g. by setting them all to a zero vector, or any suitable initialization vector. In the example method shown in FIG. 4, the recurrent neural network 401 processes the start token 402 through a plurality of neural network layers, updates the hidden states, and generates API probabilities 403-1 for a first-time step. An API request 404-1 for the first-time step is selected based on the API probabilities 403-1. Subsequently, API request 404-1 (or an indication thereof) is input into the recurrent neural network 401 as the input for the second time step. The recurrent neural network 401 processes API request 404-1, updates hidden states, and generates API probabilities 404-2 from which API request 404-2 is selected for the second time step. Subsequently, API request 404-2 (or an indication thereof) is input into the recurrent neural network 401 as the input for the third time step. The recurrent neural network 401 processes API request 404-2, updates hidden states, and generates API probabilities 404-2 from which stop token 405 is selected for the third time step. The stop token 405 indicates that a sequence 406 of API requests has been generated. In some implementations, the stop token 405 may be processed by the recurrent neural network 401 in order to produce a classification probability for the sequence. The classification probability may indicate a probability as to whether the generated API sequence is a normal sequence of API requests, or an abnormal sequence of API requests.

Figure 5:
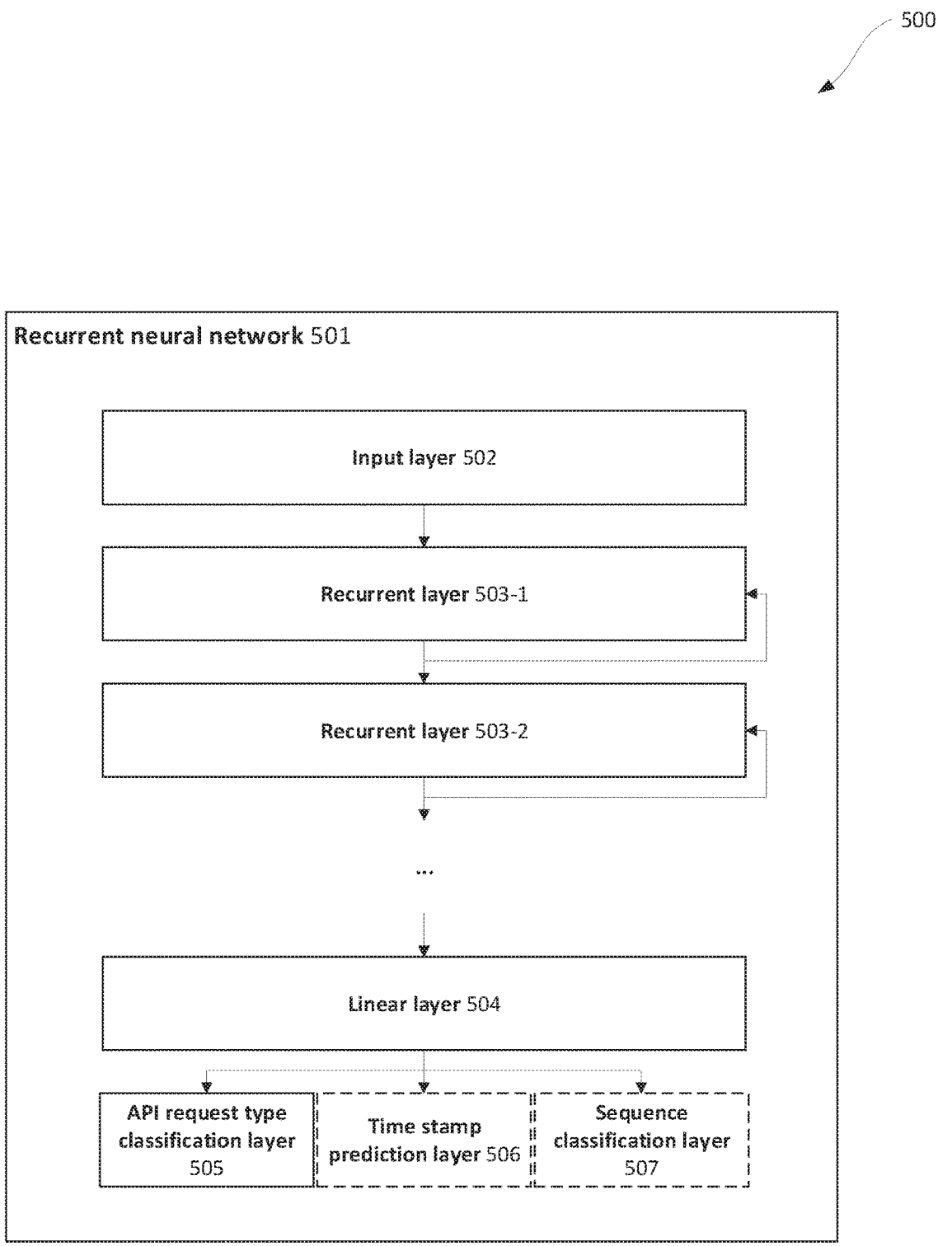
FIG. 5 is a schematic block diagram illustrating an example of a recurrent neural network used for generating API sequences.

Referring to FIG. 5, a schematic block diagram 500 illustrating an example of a recurrent neural network 501 used for generating API sequences is shown. The recurrent neural network 501 may also be used to determine API sequence probabilities and/or classify sequences of received API sequences.

Recurrent neural network 501 comprises an input layer 502, recurrent layers 503, a linear layer 504, and an API request type classification layer 505. For purposes of illustration, the recurrent neural network 501 is shown as comprising two recurrent layers 503-1, 503-2, although it will be appreciated that any number of one or more recurrent layers may be used. In some implementations, the recurrent neural network further comprises a time stamp prediction layer 506, and/or a sequence classification layer 507.

Each layer of the recurrent neural network 501 receives an input to the layer, and generates an output for the layer. Various layers of the recurrent neural network 501 are each associated with a set of parameters that are learned during training of the recurrent neural network 501. For example, input layer 502, recurrent layers 503, and linear layer 504 are each associated with a set of parameters that can be learned. Input layer 502, recurrent layers 503, and linear layer 504 may each be configured to apply one or more linear transformation to the input of the layer, in accordance with the set of parameters for the layer.

The input layer 502 receives, at each time step, an indication of either a particular type of API request out of a set of API requests that can be received at a video game server, or a start token. In embodiments where the recurrent neural network 501 is configured to classify received sequences of API requests, the input layer 502 may further be configured to receive a stop token. The input layer 502 processes the received input for the time step in accordance with its parameters, and generates an output. The output for the input layer 502 may be a linear transformation of the received input, or a non-linear activation function may be (e.g. a tanh activation function, a sigmoid activation function, a ReLU activation function, etc.) applied to the linear transformation of the received input.

Each recurrent layer 503 comprises a hidden state that is updated as the recurrent neural network 501 processes a sequence of API requests. For each time step, recurrent layer 503 receives its hidden state from the previous time step, and an input to the recurrent layer 503 for the current time step. Recurrent layer 503 processes the previous hidden state and the current input in accordance with its parameters and generates an updated hidden state for the current time step. For example, recurrent layer 503 may apply a first linear transformation to the previous hidden state and a second linear transformation to the current input and combine the results of the two linear transformations e.g. by adding the two results together. Recurrent layer 503 may apply a non-linear activation function to generate an updated hidden state for the current time step.

For each time step, linear layer 504 receives an output of a preceding layer (e.g. a hidden state generated for the current time step by a recurrent layer 503) as input. The linear layer applies a linear transformation to its received input, in accordance with its parameters, and generates a linear output for the time step.

For each time step, API request type classification layer 505 receives the linear output for the time step, processes the linear output for the time step, and generates API probabilities. The API probabilities for a time step are a vector with elements that indicate a probability of generating each API request in the set of API requests, in addition to a probability of generating a stop token, and is conditioned on the inputs of the previous time steps to the recurrent neural network 501. The API request type classification layer 505 may generate API probabilities for a time step by applying a softmax to the linear output (or a suitable portion thereof) of the time step. Alternatively, the API request type classification layer 505 may generate API probabilities for a time step by first applying a linear transformation to the linear output for the time step, in accordance with a set of associated parameters, and then applying a softmax.

The recurrent neural network 501 may comprise a time stamp prediction layer 506. For each time step, a time stamp prediction layer 506 may be configured to receive the linear output for the time step, process the linear output, and generate a time stamp for the time step.

The recurrent neural network 501 may comprise a sequence classification layer 507. At a certain time step, a stop token may be received by input layer 502, indicating that an entire sequence of API requests has been processed by the recurrent neural network 501. At this time step, sequence classification layer 507 may be configured to receive the linear output for the time step, process the linear output, and generate a probability for a classification of the API sequence. The classification may indicate whether the processed API sequence is a normal sequence of API requests, or an abnormal sequence of API requests. The sequence classification layer 507 may comprise a sigmoid activation function.

Figure 6:
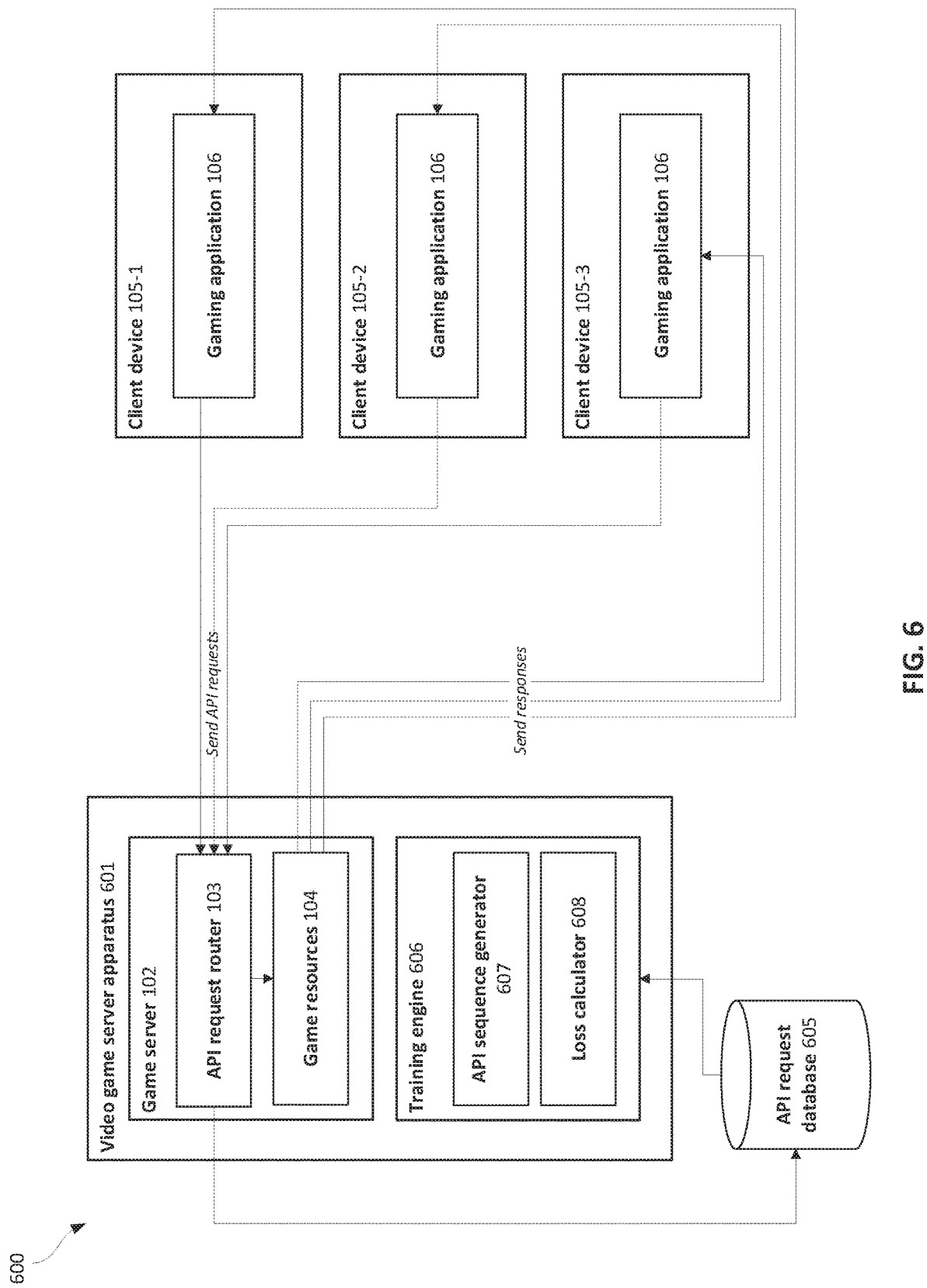
FIG. 6 is a schematic block diagram illustrating an example of a computer system configured to train a recurrent neural network to generate API sequences.

Referring to FIG. 6, schematic block diagram 600 illustrating an example of a computer system configured to train a recurrent neural network to generate API sequences is shown. FIG. 6 shows various components of the system as described in relation to FIG. 1, in addition to an API request database 605, and training engine 606. In particular, as shown, video game sever apparatus 601 comprises game server 102 and training engine 606.

The game server 102 comprises an API request router 103 and game resources 104. The API request router 103 receives the API requests, from the gaming application 106, and provides video game content from the game resources 104 responsive to the API request to the gaming application 106.

The API request router 103 is configured to store sequences of API requests transmitted by client devices 105-1, 105-2, 105-3 in the API sequence database 605. For example, the API request router 103 may store all of the API requests (or a portion thereof, e.g. by filtering based on specified API request types, and/or by selecting a certain number of API requests made in a certain time period) made by a particular client computing device 105 as a sequence of API requests.

The API sequence generator 607 comprises a recurrent neural network being trained to generate API sequences using training data comprising sequences of API requests made by users of gaming application 106. The recurrent neural network comprises a plurality of parameters which are learned during the training process.

When training the recurrent neural network, training engine 606 receives one or more sequences of API requests that are stored in the API sequence database. The training engine 606 generates a training set of one or more training examples by processing the one or more received sequences of API requests. This may include, for each sequence of API requests: adding a start token to the beginning of the sequence; adding a stop token to the end of the sequence; padding the sequence to reach a maximum length; and representing each of the values of the sequence (e.g. API requests, start/stop tokens, and padding values) by a one-hot vector. Each training example comprises an input for each time step of a plurality of time steps.

The recurrent neural network receives the one or more training examples. During training, the recurrent neural network is trained to sequentially predict elements of the received sequence, given the portion of the sequence preceding the element being predicted. In other words, for a training example, the target output for a given input is the input of the next time step. The recurrent neural network may also be trained to predict time stamps for each time step. In these embodiments, each training example comprises a sequence of (API request type, time stamp) pairs. The recurrent neural network may also be trained to classify sequences of API requests. In these embodiments, each training example additionally comprises a ground truth label indicating whether the API sequence of the training example is a normal API sequence or an abnormal API sequence. When preparing training examples, an individual tasked with labelling API sequences may determine that certain API sequences are "normal", for example because these API sequences are recorded in game tester logs or otherwise occurred when the game was actually being played, or because the probability of these sequences occurring when the game is actually being played exceeds a predetermined threshold. These sequences may be labelled as "normal" in the training data. Similarly, the labeller may determine that certain API sequences are "abnormal", for example because they have never occurred when the game was played, or because the probability of these sequences occurring when the game is actually being played is lower than a predetermined threshold, and may label these sequences as "abnormal". In this way the recurrent neural network may be trained to distinguish between such normal and "abnormal" API sequences.

The recurrent neural network processes the one or more training examples by inputting the one or more training examples into the recurrent neural network. The recurrent neural network may receive the one or more training examples as a batch, wherein a batch of inputs for a particular time step comprises the input of the particular time step of each training example. The batch of inputs for the first-time step are processed by the recurrent neural network (in accordance with a current set of parameters), and a batch of API probabilities for the first-time step is output by the recurrent neural network. The recurrent neural network may also output a batch of time stamps for the first-time step.

Loss calculator 608 receives the batch of API probabilities for the first-time step, and compares this to a batch of inputs for the second time step in order to calculate a batch of losses for the first-time step. Each loss of the batch of losses may comprise a cross-entropy loss. Loss calculator 608 may also receive the batch of time stamps for the first-time step, and compare this with a batch of ground truth time stamps for the first-time step. In these embodiments, each loss may further comprise a mean-squared error, for example by calculating a linear combination of the cross-entropy loss (for the API request type) and a mean-squared error (for the time stamp).

The above process is repeated for a number of time steps: a batch of inputs for a time step are processed by the recurrent neural network (in accordance with the current set of parameters) to generate a batch of API probabilities for the time step, and the loss calculator 608 compares the batch of API probabilities for the time step with the batch of inputs for the next time step to calculate a batch of losses for the time step. A batch of losses for a time step comprises a loss for the time step for each training example. When training engine 606 updates the parameters of the recurrent neural network, the loss calculator 608 combines the batches of losses determined at each time step of the number of time steps, e.g. by determining an average of the respective losses. The training engine 606 performs an optimization procedure in order to minimize the combined loss and determines an updated set of parameters for the recurrent neural network. For example, the optimization procedure may comprise performing backpropagation through time. The parameters of the recurrent neural network are repeatedly updated during the training process in order to find a suitable setting of the parameters.

The recurrent neural network may also be trained to classify sequences of API requests. For a training example, a stop token may be received by recurrent neural network at certain time step, indicating that an entire sequence of API requests has been processed. At this time step, the recurrent neural network may output a classification probability for the API sequence. The classification may indicate whether the processed API sequence is a normal sequence of API requests, or an abnormal sequence of API requests. In these embodiments, the loss calculator 608 receives the classification probability output by the recurrent neural network for each training example, and compares this to the corresponding ground-truth classification label for the training example. The comparison may be used to determine a further loss for each of the training examples, which may be combined, e.g. by determining an average of the further losses. The training engine 606 performs an optimization procedure in order to minimize the combined loss and determines an updated set of parameters for the recurrent neural network. For example, the optimization procedure may comprise performing backpropagation through time.

Figure 7:
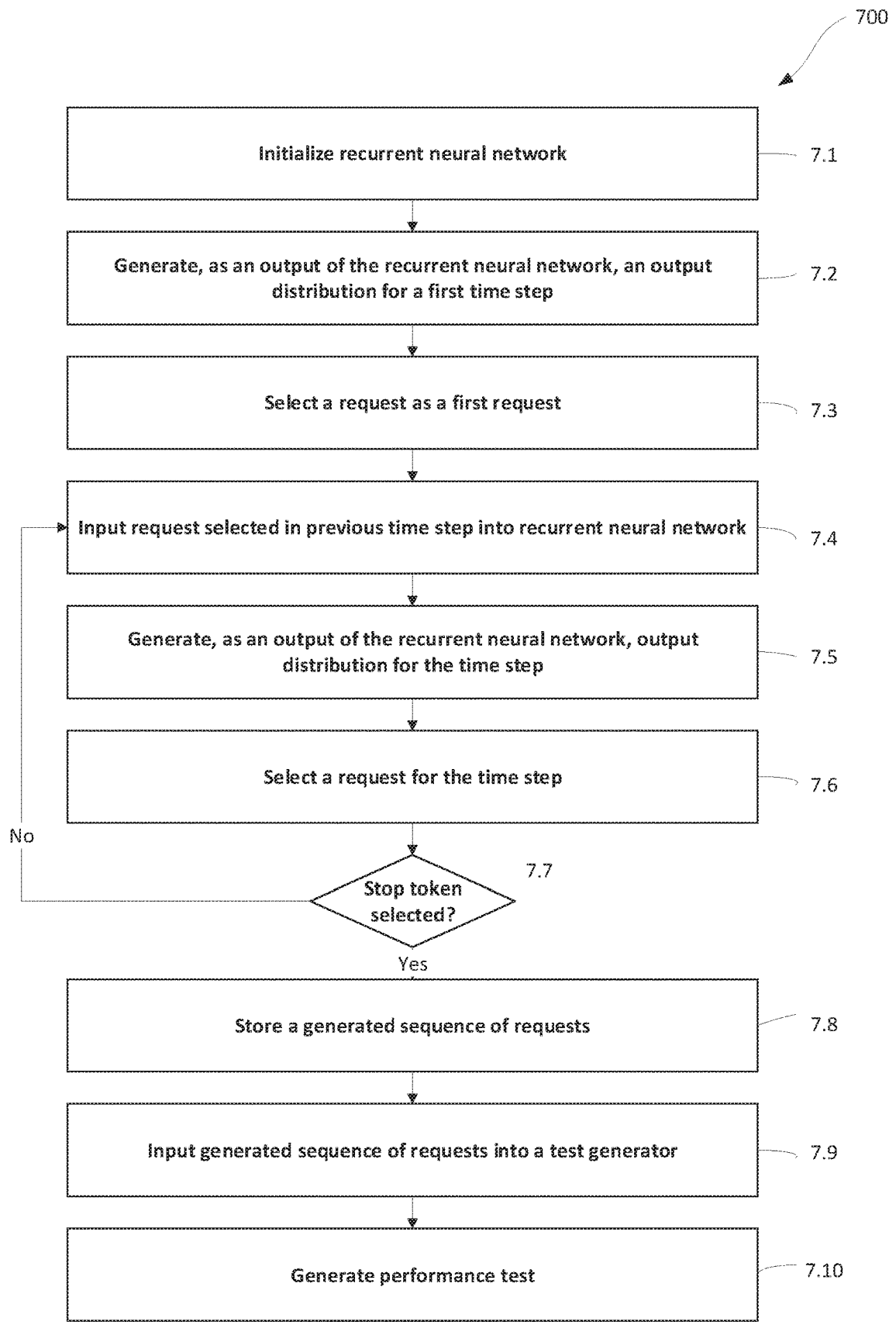
FIG. 7 is a flow diagram illustrating an example method for testing the performance of a video game server.

Referring to FIG. 7, a flow diagram of an example method 700 for testing the performance of a video game server is shown. FIG. 7 shows a general overview of the methods described in relation to FIGS. 2 and 3.

In step 7.1, a recurrent neural network is initialized, comprising inputting a start token into the recurrent neural network. The recurrent neural network is trained using user interactions with the video game server. User interactions with the video game server may comprise requests that can be transmitted from a client device of a user to the video game server. For example, the request may be an API request, e.g. a REST call or a SOAP call; or a message queue; or any other suitable request.

In step 7.2, an output distribution for a first-time step is generated, as an output of the recurrent neural network. The output distribution comprises a probability of generating each request with the video game server out of a set of requests, in addition to a probability of generating a stop token. This step may additionally comprise generating, as an output of the recurrent neural network, a time stamp for the first-time step.

In step 7.3, a request is selected as a first request, based on the output distribution. A request may be selected based on the output distribution in any suitable manner, e.g. by selecting the request with the highest probability, or by sampling from the distribution defined by the output distribution.

In step 7.4, the request selected in the previous time step is inputted into the recurrent neural network.

In step 7.5, an output distribution for the current time step is generated, as an output of the recurrent neural network. This step may additionally comprise generating, as an output of the recurrent neural network, a time stamp for the current time step.

In step 7.6, a request is selected as a subsequent request, based on the output distribution for the current time step. At a time step, a stop token may be selected instead of a request, depending on the output distribution for the current time step.

In step 7.7, a determination is made as to whether a stop token has been selected from output of the recurrent neural network. If yes, the method proceeds to step 7.8. If not, the method returns to step 7.4.

In step 7.8, the selected requests are stored as a generated sequence of requests. This step may further comprise classifying, from a classification probability output by the recurrent neural network, the sequence of requests as either a normal or an abnormal sequence of requests. A probability of generating each selected request may also be stored as part of the generated sequence of requests. A time stamp generated at each time step may also be stored as part of the generated sequence of requests.

In step 7.9, the generated sequence of requests is inputted into a test generator.

In step 7.10, a performance test is generated. The performance test is used to test the performance of the video game server. The method may further comprise executing the performance test. Executing the performance test may comprise, for each request of the generated sequence of requests: transmitting the request to the video game server; receiving a response from the video game server; and determining a performance result based on the response from the video game server. The performance result may comprise an indication as to whether the response from the video game server includes an error or not. The performance result may comprise the time between transmitting the request to the video game server and receiving a response. Factors such as CPU utilization, memory utilization, network utilization, and/or storage utilization of the video game server may also be monitored during the performance test.

Figure 8:
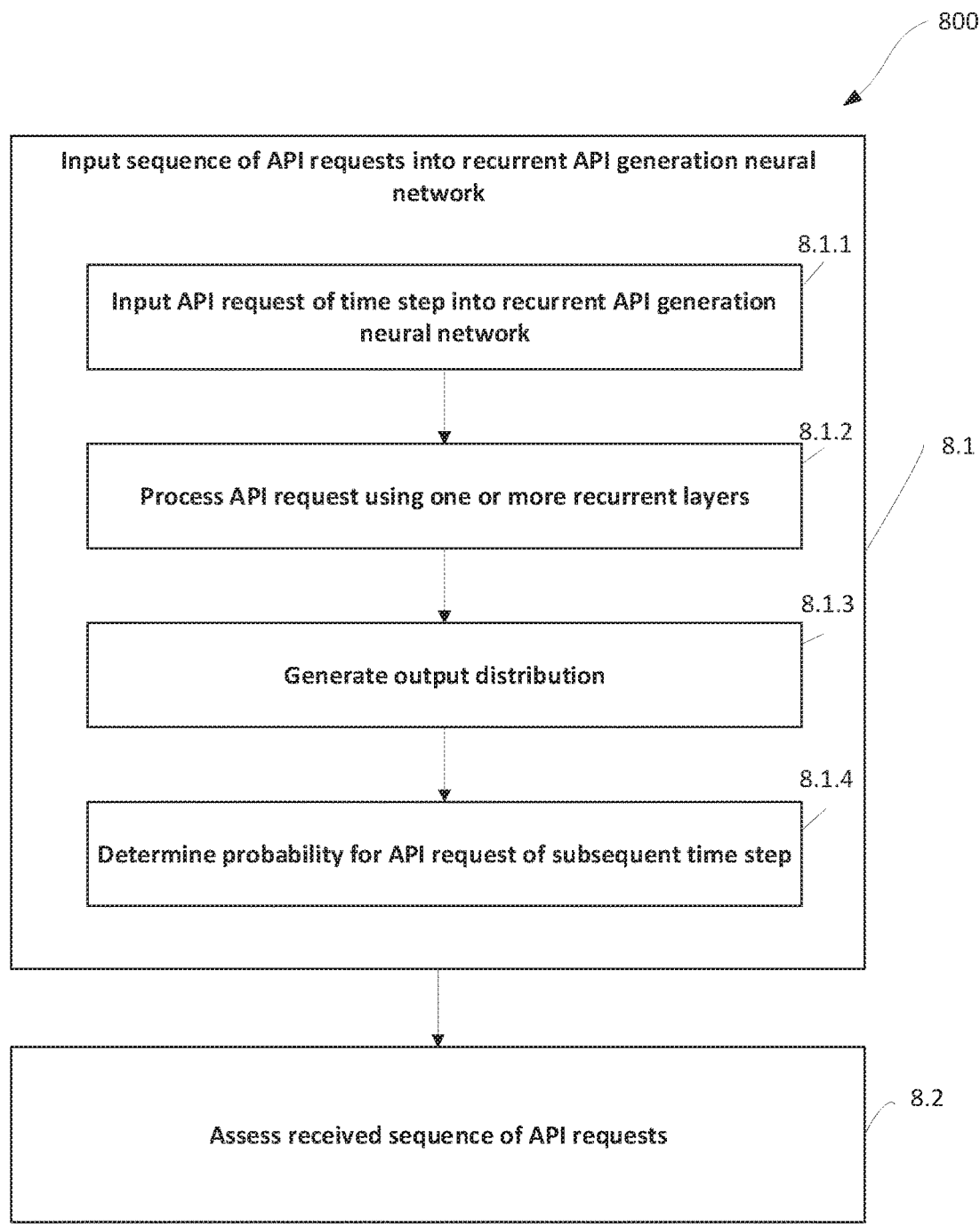
FIG. 8 is a flow diagram illustrating an example method for assessing a sequence of application programming interface (API) requests sent by one or more client devices to a video game server.

Referring to FIG. 8, a flow diagram of an example method for assessing a sequence of application programming interface (API) requests sent by one or more client devices to a video game server is shown.

In step 8.1, a sequence of API requests is input into a recurrent API generation neural network. The recurrent API generation neural network is a recurrent neural network trained to predict API sequences as described previously. The sequence of API requests comprises an API request for each time step of a plurality of time steps. Each API request is sent by one or more client devices to a video game server. The sequence of API requests may further comprise a time stamp for each API request.

Step 8.1 comprises steps 8.1.1, 8.1.2, 8.1.3, and 8.1.4, each of which are performed for each of the plurality of time steps. In step 8.1.1, the API request of the time step is input into the recurrent API generation neural network. In step 8.1.2, the API request of the time step is processed using one or more recurrent layers of the recurrent API generation neural network. In step 8.1.3, an output distribution for the time step is generated using the recurrent API generation neural network. In step 8.1.4, a probability for the API request of a subsequent time step is determined from the output distribution. This probability may be a conditional probability of generating the API request type of the time step, based on the previously inputted API requests. Alternatively, logarithms of conditional probabilities may be determined at each time step.

In step 8.2, the received sequence of API requests is assessed. This comprises determining a sequence probability for the received sequence of API requests. The probabilities generated at each time step may be used to determine an overall probability for the received API sequence. For example, they may be combined by multiplying conditional probabilities in order to obtain an overall probability. Alternatively, the logarithm of the conditional probabilities may be determined at each time step, and an overall sequence probability may be determined by summing the log probabilities together.

The method 800 may also comprise classifying the received sequence of API requests as being either a normal or an abnormal sequence of API requests. This may comprise inputting a stop token into the recurrent API generation neural network, wherein the stop token indicates the end of a sequence of API requests; processing the stop token using one or more recurrent layers of the recurrent API generation neural network; and generating, based on output of a recurrent layer, a classification probability for the sequence of API requests.

Although various embodiments set out above have described an API sequence generator, an API sequence probability estimator, and an API sequence classifier in the context of a suite of software tools for use in testing the performance of game servers, it will be appreciated that some or all of the components and/or techniques described herein may alternatively be applied in other applications within the video game industry, e.g. any other application in which one or more of generation of (e.g. API) request sequences, estimating the probability of (e.g. API) request sequences and/or classifying (e.g. API) request sequences may be useful.

Figure 9:
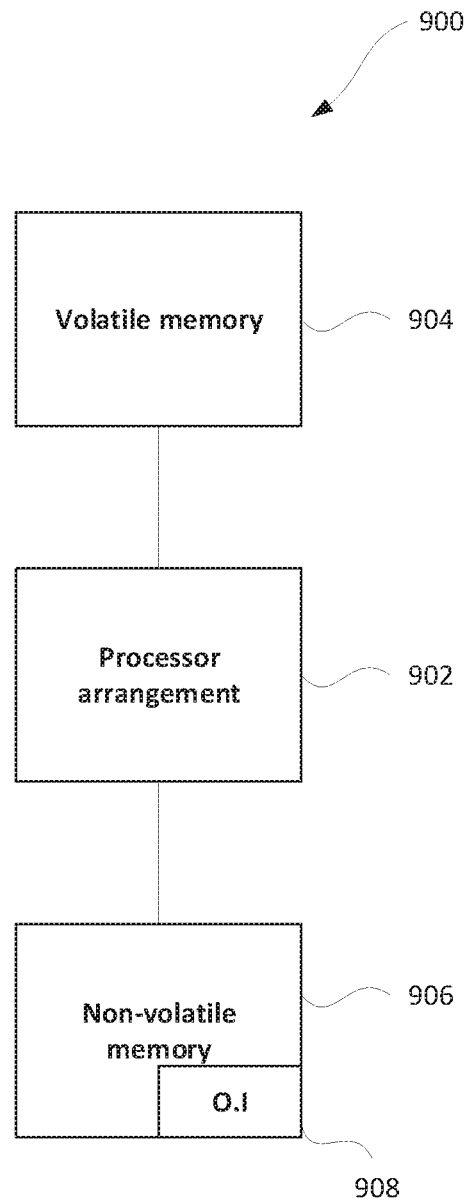
FIG. 9 shows a schematic example of a system/apparatus for performing methods described herein.

FIG. 9 shows a schematic example of a system/apparatus for performing methods described herein. The system/apparatus shown is an example of a computing device. It will be appreciated by the skilled person that other types of computing devices/systems may alternatively be used to implement the methods described herein, such as a distributed computing system.

The apparatus (or system) 900 comprises one or more processors 902. The one or more processors control operation of other components of the system/apparatus 900. The one or more processors 902 may, for example, comprise a general purpose processor. The one or more processors 902 may be a single core device or a multiple core device. The one or more processors 902 may comprise a central processing unit (CPU) or a graphical processing unit (GPU). Alternatively, the one or more processors 902 may comprise specialised processing hardware, for instance a RISC processor or programmable hardware with embedded firmware. Multiple processors may be included.

The system/apparatus comprises a working or volatile memory 904. The one or more processors may access the volatile memory 904 in order to process data and may control the storage of data in memory. The volatile memory 904 may comprise RAM of any type, for example Static RAM (SRAM), Dynamic RAM (DRAM), or it may comprise Flash memory, such as an SD-Card.

The system/apparatus comprises a non-volatile memory 906. The non-volatile memory 906 stores a set of operation instructions 908 for controlling the operation of the processors 902 in the form of computer readable instructions. The non-volatile memory 906 may be a memory of any kind such as a Read Only Memory (ROM), a Flash memory or a magnetic drive memory.

The one or more processors 902 are configured to execute operating instructions 908 to cause the system/apparatus to perform any of the methods described herein. The operating instructions 908 may comprise code (i.e. drivers) relating to the hardware components of the system/apparatus 900, as well as code relating to the basic operation of the system/apparatus 900. Generally speaking, the one or more processors 902 execute one or more instructions of the operating instructions 908, which are stored permanently or semi-permanently in the non-volatile memory 906, using the volatile memory 904 to temporarily store data generated during execution of said operating instructions 908.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 9, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method for testing the performance of a video game server, the method comprising:
   initializing a recurrent neural network trained based on requests sent from one or more client devices to the video game server, wherein initializing the recurrent neural network comprises inputting a start token into the recurrent neural network;
   generating, as an output of the recurrent neural network, an output distribution for a first-time step, wherein the output distribution comprises a probability of generating each of a set of one or more requests to the video game server, in addition to a probability of generating a stop token;
   selecting, based on the output distribution, a first request from the set of one or more requests;
   for one or more further time steps, until a stop token has been selected from output of the recurrent neural network:
      inputting, into the recurrent neural network, a request selected in the previous time step;
      generating, as an output of the recurrent neural network, an output distribution for the time step; and
      selecting, based on the output distribution, a request;
   storing a generated sequence of requests comprising one or more of the requests selected at each respective time step;
   inputting the generated sequence of requests into a test generator; and
   generating, by the test generator, a performance test for testing the performance of the video game server.

2. The method of claim 1, further comprising:
   executing the performance test, comprising,
      transmitting at least one of the requests in the generated sequence of requests to the video game server;
      receiving at least one response from the video game server; and
      determining a performance result based on the at least one response.

3. The method of claim 2, wherein the performance result comprises an indication as to whether a response from the video game server includes an error or not.

4. The method of claim 2, wherein the performance result comprises a time between transmitting the request to the video game server and receiving a response.

5. The method of claim 1, further comprising:
   classifying, from a classification probability output by the recurrent neural network, the sequence of requests into one of two or more categories.

6. The method of claim 1, further comprising storing a probability of generating each selected request.

7. The method of claim 6, further comprising determining a probability for the generated sequence of requests, using the probabilities of generating each selected request.

8. The method of claim 1, further comprising:
   generating, as an output of the recurrent neural network, a time stamp for each time step of the one or more time steps; and
   storing the one or more time stamps as part of the generated sequence of requests.

9. The method of claim 1, wherein each request of the set of requests comprises an application programming interface (API) request that can be transmitted from a client device to the video game server.

10. A computer implemented method of assessing a sequence of application programming interface (API) requests sent by one or more client devices to a video game server, wherein the sequence of API requests comprises an API request for each time step of a plurality of time steps, the method comprising:
   inputting the sequence of API requests into a recurrent API generation neural network comprising, for each time step:
      inputting the API request for the current time step into the recurrent API generation neural network;
      processing the API request using one or more recurrent layers of the API generation recurrent neural network;

generating, using the recurrent API generation neural network, an output distribution for the time step; and determining, from the output distribution, a probability for the API request of a subsequent time step; and assessing, using the determined probabilities of each time step, the received API sequence of requests, comprising determining a sequence probability for the received sequence of API requests.

11. The method of claim 10, further comprising:

inputting a stop token into the recurrent API generation neural network, wherein the stop token indicates the end of a sequence of API requests;

processing the stop token using one or more recurrent layers of the recurrent API generation neural network; and generating, based on output of a recurrent layer, a classification probability for the sequence of API requests.

12. The method of claim 11, further comprising classifying, from the classification probability, the received sequence of API requests into one of a two or more categories.

13. The method of claim 10, wherein the sequence of API requests further comprises a time stamp for each API request.

14. A computer-readable medium storing instructions, which when executed by a processor, cause the processor to:

receive a training set comprising one or more training examples, each training example comprising a sequence of requests received at a video game server from a client device, wherein the sequence of requests comprises a request corresponding to each time step of a plurality of time steps; and for each training example of the one or more training examples:

input, into a recurrent neural network, a request included in the training example for each time step of one or more training time steps, wherein the recurrent neural network comprises a current set of parameters;

generate, as an output of the recurrent neural network, an output distribution for each time step of the one or more time steps;

determine a loss for each time step of the one or more time steps, comprising performing a comparison between: (i) the output distribution for the time step, and (ii) a request included in the training example for a subsequent time step; and update the set of parameters of the recurrent neural network in dependence on the loss determined for each time step of the one or more time steps of the one or more training examples.

15. The computer-readable medium of claim 14, wherein updating the set of parameters of the recurrent neural network in dependence on the loss determined for each time step comprises:

determining an average loss over the one or more time steps of the one or more training examples.

16. The computer-readable medium of claim 14, wherein the loss for each time step of the one or more time steps comprises a cross-entropy loss.

17. The computer-readable medium of claim 14, wherein updating the set of parameters of the recurrent neural network comprises performing backpropagation through time.

18. The computer-readable medium of claim 14, wherein:

each training example of the one or more training examples further comprises a ground-truth label indicating whether the training example is in one of two or more categories; and updating the set of parameters of the recurrent neural network further comprises, for each training example of the one or more training examples:

generating, as an output of the recurrent neural network, a classification probability, wherein the classification probability indicates a probability of the training example as being in one of said two or more categories; and updating the set of parameters of the recurrent neural network in dependence on a comparison between the classification probability, and the corresponding ground-truth label for the training example.

19. The computer-readable medium of claim 14, wherein:

each training example of the one or more training examples further comprises a ground-truth time stamp for each time step; and updating the set of parameters of the recurrent neural network further comprises, for each training example of the one or more training examples:

generating, as an output of the recurrent neural network, a time stamp for each time step of the training example; and updating the parameters of the recurrent neural network in dependence on a comparison between the generated time stamp of each time step, and the corresponding ground-truth time stamp for each time step of the training example.

20. The computer-readable medium of claim 14, wherein each request of the received sequence of requests comprises an API request transmitted from a client device to the video game server.

* * * * *

UNITED STATES PATENT AND TRADEMARK OFFICE
CERTIFICATE OF CORRECTION

| | | |
|---|---|---|
| PATENT NO. | : 11,734,547 B2 | |
| APPLICATION NO. | : 17/014934 | |
| DATED | : August 22, 2023 | |
| INVENTOR(S) | : Matthew Luther and Mohsen Alimomeni | |

It is certified that error appears in the above-identified patent and that said Letters Patent is hereby corrected as shown below:

In the Specification

In Column 3, Line 30, delete "too" and insert -- 100 --, therefor.

In Column 3, Line 39, delete "too" and insert -- 100 --, therefor.

Signed and Sealed this
Tenth Day of October, 2023

*Katherine Kelly Vidal*

Katherine Kelly Vidal
*Director of the United States Patent and Trademark Office*